Patented May 12, 1931

1,804,870

UNITED STATES PATENT OFFICE

RUDOLF M. HEIDENREICH, OF ELBERFELD, GERMANY, ASSIGNOR TO GENERAL ANILINE WORKS, INC., OF NEW YORK, N. Y., A CORPORATION OF DELAWARE

NEW COMPOUNDS OF THE BENZANTHRAQUINONE SERIES

No Drawing. Application filed October 15, 1927, Serial No. 226,528, and in Germany October 23, 1926.

The present invention relates to new compounds of the benzanthraquinone series and to a process of preparing same. More particularly it relates to the compounds of the general formula:

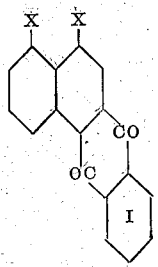

wherein X stands for the carboxylic acid group, or both X's jointly stand for the group:

and wherein the nucleus marked I may be substituted by halogen atoms.

I have found that the naphthalic-acid-4-benzoyl-ortho-carboxylic acid, which has been described by Graebe in Annalen der Chemie vol. 327 p. 101, and the derivatives thereof, are converted by heating with acid condensing agents such as sulfuric acid, aluminium chloride, etc. into new compounds of the benzanthraquinone-series. I prefer to carry out this process by heating the naphthalic acid compounds to a temperature of about 170–200° C. in the presence of concentrated sulfuric acid with or without the addition of boric acid. The reaction takes place e. g. according to the following equation:

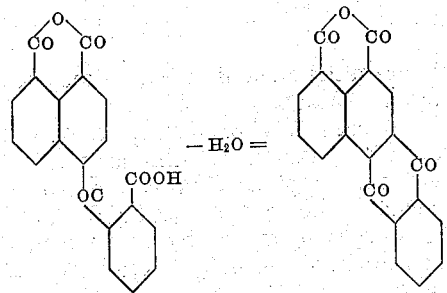

The anhydride thus obtained can be easily converted into the benzanthraquinone-peri-dicarboxylic acid by the customary methods.

The following examples will illustrate my invention without limiting it thereto. All parts are by weight:

*Example 1.*—1 part of naphthalic acid anhydride - 4 - benzoyl-ortho-carboxylic acid (melting point 232° C.) is heated to about 170–200° C. with 5 parts by volume of concentrated sulfuric acid. The reaction is completed, when, by diluting a test portion with water, a yellow compound is precipitated instead of the white unchanged carboxylic acid. The completion of the reaction is furthermore proven when the red color of the vat which results by adding caustic soda solution and hydro sulfite to a test portion remains unchanged. Generally the reaction is completed after about twenty minutes. The melt is poured into water and the 1.2-benzanthra-quinone-peri-dicarboxylic acid thereby precipitated is washed with water. On re-crystallizing from a large amount of nitro-benzene or ortho-dichloro-benzene the anhydride is obtained in beautiful golden yellow needles, which dissolve in sulfuric acid with a reddish-yellow color, in alkali with a yellow color and melt above 300° C. The free peri-dicarboxylic acid can be precipitated with acid from the alkaline solution of the anhydride at room temperature, on heating the same, it is again transformed into its anhydride. Benzan-thraquinone-peri-dicarboxylic acid yields with alkali and hydrosulfite a beautiful red vat from which the acid is recovered by blowing air through the solution. The new product is presumed to possess the following formula:

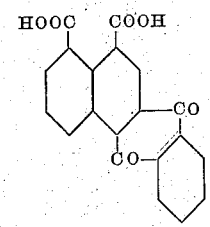

*Example 2.*—Acenaphthene is suspended in carbon disulphide and condensed with the anhydride of 3.6-dichloro-phthalic acid by means of anhydrous aluminium chloride, whereby acenaphthoyl-5-3′-6′-dichloro-phenyl-ortho-carboxylic acid is obtained (white needles from chlorobenzene, melting at 239° C. uncorr.). Oxidation with sodium bichromate causes conversion into naphthalic acid anhydride - 4 - benzoyl- 3′ -6′-dichloro-ortho-benzoic acid, (white needles from glacial acetic acid, melting at 274° C. uncorr.). When the latter is heated for about twenty minutes in concentrated sulfuric acid according to the process described in Example 1, the anhydride of 1.2-benzanthraquinone-5.8-dichloro-peri-dicarboxylic acid is obtained, (yellow needles from nitrobenzene). The new compound is presumed to possess the following formula:

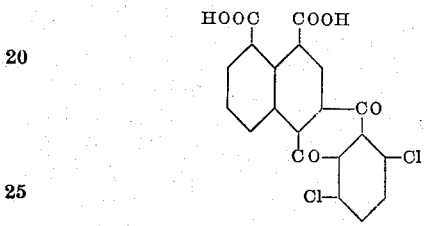

In the same way e. g. from 1.8-naphthalimid-4-benzoyl-ortho-carboxylic acid the 5.6-benzanthraquinone-peri-dicarboxylic acid imide having most probably the formula:

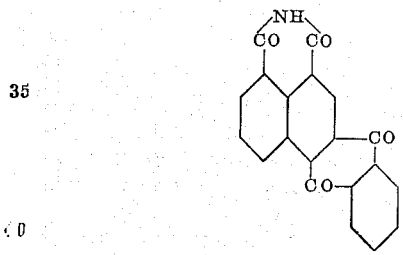

melting at 300° C. is obtained. From 1.8-naphthal-(N-methyl)-imid-4-benzoyl-ortho-carboxylic acid the methyl substituted product is obtained melting at 280° C. The aryl substituted derivatives can be produced in the same way. From 1.8-naphthoyleneobenzimidazol-4-benzoyl-ortho-carboxylic acid a product results having most probably the following formula:

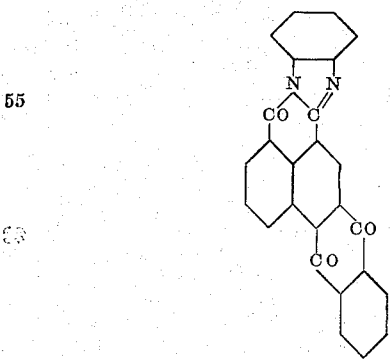

I claim:

1. As new products the compounds of the general formula:

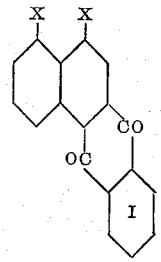

wherein X stands for the carboxylic acid group, or both X's jointly stand for the group:

and wherein the nucleus marked I may be substituted by halogen atoms.

2. As a new product the compound of the formula:

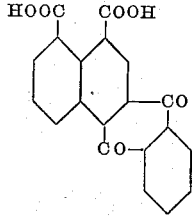

which crystallizes in the form of its anhydride in beautiful golden-yellow needles, dissolving in strong sulfuric acid with a reddish-yellow color and melting above 300° C.

3. A process for the manufacture of new compounds of the benzanthraquinone series which consists in heating to an elevated temperature in the presence of an acid condensing agent a compound of the general formula:

wherein X stands for the carboxylic acid group, or both X's jointly stand for the group:

and wherein the nucleus marked I may be substituted by halogen atoms.

4. A process for producing a new compound of the benzanthraquinone series which consists in heating naphthalic-acid-4-benzoyl-ortho-carboxylic-acid to about 170–200° C. in the presence of concentrated sulfuric acid.

In testimony whereof I have hereunto set my hand.

RUDOLF M. HEIDENREICH.

Certificate of Correction

Patent No. 1,804,870.                                           Granted May 12, 1931, to

RUDOLF M. HEIDENREICH

It is hereby certified that error appears in the printed specification of the above-numbered patent requiring correction as follows: Page 2, claim 3, after line 105, insert the following formula:

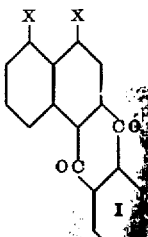

Same page and column, after line 117, insert the following formula:

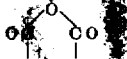

and that the said Letters Patent should be read with these corrections therein that the same may conform to the record of the case in the Patent Office.

Signed and sealed this 21st day of July, A. D. 1931.

[SEAL.]

M. J. MOORE,
*Acting Commissioner of Patents.*